Jan. 19, 1943.  R. L. JENNER  2,308,694
ELECTRIC CONDENSER
Filed Dec. 24, 1938  5 Sheets-Sheet 2

INVENTOR.
Ralph L. Jenner
BY Cumpston & Shepard
his ATTORNEYS

Jan. 19, 1943.     R. L. JENNER     2,308,694
ELECTRIC CONDENSER
Filed Dec. 24, 1938     5 Sheets-Sheet 3

INVENTOR
Ralph L. Jenner
BY Cumpston & Shepard
his ATTORNEYS

Jan. 19, 1943.   R. L. JENNER   2,308,694
ELECTRIC CONDENSER
Filed Dec. 24, 1938   5 Sheets-Sheet 5

INVENTOR.
Ralph L. Jenner
BY Cumpston & Shepard
his ATTORNEYS

Patented Jan. 19, 1943

2,308,694

UNITED STATES PATENT OFFICE 2,308,694

ELECTRIC CONDENSER

Ralph L. Jenner, Le Roy, N. Y., assignor to Lapp Insulator Company, Inc., Le Roy, N. Y., a corporation of New York Application December 24, 1938, Serial No. 247,585

17 Claims. (Cl. 175—41)

The present invention deals with electric condensers, and has for one object the provision of a generally improved condenser construction.

Another object of the invention is the provision of a condenser of relatively high capacitance in proportion to its weight and size, and having relatively great dielectric strength.

Still another object is the provision of an electric condenser which is sealed in a gas tight manner so that it may be operated at pressure above or below that of the surrounding atmosphere, and so that access of dust, insects, or other foreign matter to the condenser plates is prevented.

A further object is the provision of a condenser so designed that the greater the pressure difference between the interior of the condenser and the surrounding atmosphere, the greater will be the sealing pressure on the main joints of the condenser casing.

A still further object is the provision of various improved features of condenser construction, such as an improved way of holding the condenser plates, an improved shape or form of condenser plates, an improved shape of dielectric supporting body for the "rotor" parts of the condenser, so designed that a large area is exposed to free circulation of air for easy cooling, and an improved bearing for the rotor shaft of the condenser.

A still further object is the provision of various improved features of condenser construction, so designed that they may be employed in condensers of the adjustable type and in condensers of the variable type, as well as in condensers of the fixed type.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Condensers embodying the present invention are intended mainly to use air or other gas as the dielectric between the condenser plates, at atmospheric pressure, super-atmospheric pressure, or sub-atmospheric pressure, or to employ a high vacuum for this purpose, although in some instances a dielectric liquid rather than gas may be employed, likewise at atmospheric pressure, super-atmospheric, or sub-atmospheric pressure.

Figures 1, 2, 3:
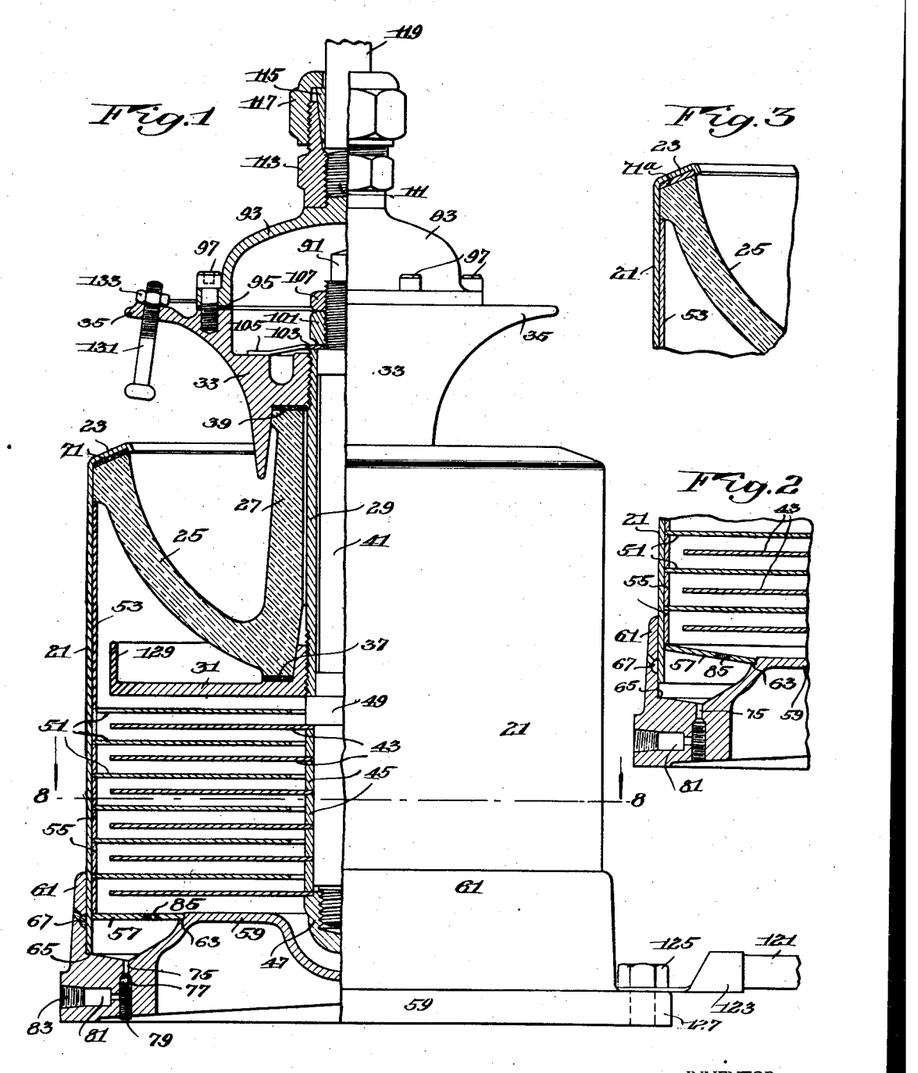
Fig. 1 is a view of a condenser constructed in accordance with one embodiment of the present invention, showing it partly in side elevation and partly in central vertical section.
Fig. 2 is a fragmentary view similar to the lower left corner of Fig. 1, with the parts in a different position which they assume at an intermediate stage in the assembly of the condenser.
Fig. 3 is a fragmentary view similar to the upper left corner of Fig. 1 illustrating a different form of joint.

Referring first to Fig. 1 of the drawings, there is disclosed one form of condenser according to the present invention, intended to be filled with fluid (whether liquid or gas) at atmospheric pressure, or super-atmospheric pressure. This condenser comprises a casing 21 of generally cylindrical form, preferably made of thin sheet metal. The upper edge of the casing is flanged inwardly as at 23. Set within the top of the casing is a dielectric element of porcelain or other suitable dielectric material having a downwardly dished portion 25 extending from the periphery of the casing 21 downwardly and inwardly toward the center, and having a long hollow stem portion or tubular portion 27 integral with the portion 25 and extending axially of the casing 21. Within the tubular portion 27 is a metal bearing sleeve or tube 29 screw threaded at its lower end into a metal plate 31 and screw threaded at its upper end into a top fixture 33 of metal having upwardly and outwardly flaring sides 35. By turning one or the other of the members 31 and 33 relatively to the sleeve 29, the parts are tightened so as to place the sleeve 29 in tension and the tubular portion 27 of the porcelain element in compression, and so as to compress the sealing gaskets 37 and 39 which are placed at the bottom and top edges, respectively, of the tubular porcelain portion 27.

Extending downwardly through the metal bearing sleeve 29 and into the interior of the casing 21, is a shaft 41. On the part of this shaft which is below the plate 31 there are mounted any desired number of condenser plates 43, which may for convenience be referred to as the rotor plates regardless of whether the shaft 41 is mounted to turn or is fixed in one position. These rotor plates 43 are of metal and are secured on the shaft 41 by having holes formed centrally in the rotor plates through which the shaft extends, the plates being spaced from each other longitudinally of the shaft by means of annular spacing sleeves 45. A cap nut 47 screwed on the bottom of the shaft contacts with the lowest rotor plate or the lowest spacing sleeve and holds all of the spacing sleeves in compression, clamping all of the rotor plates tightly and immovably on the shaft 41, between the nut 47 and a fixed collar or enlargement 49 on the shaft just beneath the bottom of the sleeve 29.

The condenser also includes a second series of any desired number of plates 51 which may conveniently be referred to as the stator plates, which alternate with the rotor plates 43. For holding these stator plates in position, at least parts of their outer peripheries (and preferably the whole of such outer peripheries) are formed to fit fairly snugly against the inner surface of the cylindrical casing 21, and are held and clamped by means of a long spacing sleeve 53 which extends from the porcelain element 25 down to the top of the uppermost stator plate 51, and by other and shorter annular spacing sleeves 55 placed between adjacent stator plates. A tension ring 57 presses upwardly against the lower edge of the bottom spacing sleeve 55 and reacts downwardly against the metallic bottom plate 59 which extends across and closes the bottom of the casing 21, hermetically sealed thereto by a sweated or soldered joint. The upward thrust of the tension ring 57 maintains all of the spacing sleeves 53 and 55 under compression and thus holds all of the stator plates 51 firmly and immovably within the condenser. This thrust also serves to hold the porcelain element 25 tightly against its seat on the metal casing portion 23.

The rotor plates 43 are of such size that they do not contact with the casing 21 or the spacing sleeves 55, while the stator plates 51 have openings at their centers through which the shaft 41 and spacing sleeves 45 pass in spaced relation to the stator plates.

It should be especially noted that the shaft 41 has no bearing or support on the bottom plate 59, the shaft being supported entirely by the bearing sleeve 29 in the tubular portion 27 of the porcelain element. This construction may be described as a cantilever support for the rotor plates, since the support of the rotor shaft is entirely above the rotor plates, without any support or lateral bearing below the plates, and the plates are held against lateral deflection by the cantilever stiffness of the shaft 41. Thus it is necessary to use only one porcelain element (25, 27) for supporting the rotor side of the condenser from the stator side thereof, and there is a great reduction in dielectric loss over those constructions where a dielectric bearing is provided for the lower end of the rotor shaft.

In assembling the condenser, the casing or shell 21 is placed in inverted position, the porcelain element 25, 27 is inserted through the open bottom (now the top when the parts are inverted) with the shaft 41 in place therein, and the stator and rotor plates are successively placed in position through the open bottom (now the top) of the casing, until finally the last rotor plate is placed, whereupon the nut 47 is screwed onto the end of the shaft 41. The tension ring 57, in its initially dished or frusto-conical shape shown in Fig. 2, is placed in position against the last spacing sleeve 55. The bottom member 59 is then placed on top of what is now the upper end (in inverted position) of the casing 21, and pressed downwardly by mechanical pressure means or otherwise. The annular marginal flange 61 of the bottom member 59 slides along the exterior of the casing 21 and a shoulder 63 contacts with the inner edge of the annular tension ring 57 and forces this inner edge in a direction axially of the condenser so that the ring is deformed from its initial dished shape of Fig. 2 to approximately the plane shape shown in Fig. 1, thereby being tensioned and placing all of the spacing sleeves 53 and 55 under compression to hold the stator plates snugly.

The pressing movement of the bottom 59 onto the casing is continued until the extreme edge of the casing 21 is seated snugly against a shoulder 65 of the bottom 59, whereupon no further compressing movement can take place. Then the annular flange 61 of the bottom member is soldered, sweated, or otherwise hermetically secured to the casing 21, such as by heating these parts and pouring molten solder into the annular solder groove 67 formed in the flange 61. When the solder has cooled and hardened, there is a hermetical joint between the bottom member 59 and the casing 21, so that these parts are gas tight.

The joint between the member 25 and the casing 21 (or the flange 23 thereof) may be sealed by a gasket, or by a permanent hermetical seal, whichever is preferred. In Fig. 1, the parts are illustrated as sealed by a gasket 71 to maintain a gas tight joint. In Fig. 3 a fragment of the same condenser is illustrated, with the joint soldered, as indicated at 71a, to make a permanent hermetical seal. This soldering of the metal 23 to the porcelain 25 is possible in several ways, such, for example, as by coating the appropriate part of the porcelain member 25 while it is being constructed, with a metallic flux, to which solder will adhere. Or again, the appropriate part of the surface of the porcelain member 25 may be formed somewhat rough, and a thin layer or coating of metal may be applied thereto, such as by being pressed on under heavy pressure, or shot onto the porcelain surface with a Schoop gun, or otherwise. Then the solder 71a will adhere to the thin metal coating previously formed on the porcelain.

In the same way, a hermetical soldered joint may be substituted for the gasket 37 between the metal piece 31 and the porcelain 25, or for the gasket 39 between the metal piece 33 and the porcelain portion 27, if desired.

Regardless of whether a gasket or a permanent soldered joint is employed, at 71 or 71a, the constant pressure provided by the tension ring 57 is in a direction tending to tighten this joint rather than to loosen it, and the same is true of any fluid pressure maintained within the condenser, for such fluid pressure would tend to raise the porcelain member 25 with relation to the casing 21, which would increase the contacting pressure at the joint 71 or 71a. This is far superior, as regards gas tightness, to the condenser constructions heretofore employed, where internal gas pressure has heretofore tended to open the joint rather than to close it more firmly as in the present instance. It is also noted that even if a condenser initially designed for internal fluid pressure should, through some leak, have its internal pressure reduced to atmospheric pressure, the joint between the porcelain and the metal would still be kept tight by the spring effect of the ring 57.

This condenser construction is advantageous even where air at atmospheric pressure is used as the dielectric upon the plates, for the gas tight seal of the condenser casing prevents entrance of dust, insects, or other foreign matter which frequently cause trouble in condensers which are not hermetically sealed. The construction is especially advantageous, however, where it is desired to have the dielectric at a pressure above atmospheric pressure, or where it is desired to have the dielectric formed of a fluid other than air, for the tight seal of the condenser casing enables the condenser to retain without leakage any desired dielectric, either at atmospheric pressure or at any reasonable pressure above atmospheric.

For filling the interior of the condenser with the desired dielectric, the bottom plate 59 may be provided with a duct 75 having a ball valve 77 retained against a seat in the duct by a screw 79, and having a lateral duct 81 intersecting the main duct 75, this duct 81 having a screw threaded portion 83 into which may be screwed the nipple of a hose or conduit carrying the desired dielectric (either liquid or gas) under the desired pressure. When the nipple has been screwed into the threads 83, the screw 79 may be backed off sufficiently to establish communication between the ducts 81 and 75, whereupon the dielectric can be caused to flow into the casing to build up the desired pressure, the dielectric passing through small holes 85 in the tension ring 57. If the dielectric is a gas, it fills the whole interior of the casing, of course. If it is a liquid, the casing can be filled to any desired point, and usually the liquid level will be somewhat above the plate 31 but below the top of the available space in the condenser. As the liquid level rises, the air or other gas initially in the condenser casing will be trapped by the liquid in the annular space around the member 25, and the gas thus trapped will be compressed until it reaches any desired pressure, equal, of course, to the pressure under which the liquid is inserted. The liquid will surround the condenser plates and act as the dielectric between the plates, while the gas under pressure will not act as the dielectric between the plates but will serve as a compression reservoir to maintain the liquid under pressure even if a small quantity of liquid should escape. Since liquid is substantially incompressible, the escape of a few drops would quickly lower the pressure of the liquid if no body of compressed gas were present in the condenser.

When the filling of the condenser with the dielectric has been completed, the screw 79 is screwed home, pressing the ball 77 firmly against its seat and thus sealing the duct 75.

The above described features of construction are applicable to condensers of the fixed type, of the adjustable type, and of the variable type. If the condenser is of the fixed type, that is, having only the one capacitance for which it is initially designed, then the stator plates and rotor plates would both be preferably of circular annular form as shown respectively in Figs. 10 and 11. If the condenser is either of the adjustable type (that is, capable of initial adjustment to a certain capacitance within a range, and perhaps capable of occasional adjustment thereafter, although not intended to be adjusted frequently) or if the condenser is of the variable type (capable of and intended for frequent adjustment to different capacitances) then at least some of the stator and rotor plates, and perhaps all of them if desired, would be of some suitable non-circular construction, such as the constructions illustrated in Figs. 12 to 16, inclusive. The condenser of Figs. 1 to 3 is illustrated by way of example as a condenser of the fixed type, the circular plates being shown in the cross sectional view of Fig. 8, but it is understood, of course, that the same construction of the casing and associated parts can be used for adjustable or variable condensers, except for modification of the shape of the stator and rotor plates and possibly some modification of the manner of mounting or holding the shaft.

If the condenser is of the fixed type, the shaft 41 is preferably hermetically sealed in the sleeve 29, as, for example, by making a brazed or soldered joint between the two. As indicated in Fig. 1, the shaft 41 is of greater diameter near the top and bottom of the sleeve 29, fitting snugly within the sleeve, but is of reduced diameter between its two full diameter portions so that during most of its length the shaft is spaced slightly from the sleeve. This space between the shaft and the sleeve may be filled with solder, after the parts have been suitably heated, by means of any suitable solder duct or opening (not shown).

If the condenser is of the adjustable type, then the upper end of the shaft is preferably formed square, hexagonal, or of other suitable non-circular shape, as indicated at 91 in Fig. 1, so that a wrench may grip the upper end of the shaft and turn it in one direction or the other to adjust the condenser to exactly the desired capacitance. It is understood, of course, that in this adjustable type, at least one pair of plates (stator and rotor) are of non-circular shape, so that turning the rotor plate relatively to the stator plate would alter the capacitance. When the adjustment to the desired capacitance has been made, the space between the shaft 41 and the surrounding sleeve 29 may be filled with solder to make a hermetical seal, just as in the case of the fixed condenser; or the shaft may be soldered lightly to the sleeve merely at the top of the sleeve, to make a joint which is sealed for the time being but capable of being unsoldered if it is necessary to adjust the condenser later to a different capacitance; or there may be no attempt to provide a hermetical seal between the shaft and the surrounding sleeve, and other means may be provided to prevent escape of pressure from the condenser. Such other means may, for example, take the form of the dome 93 having a margin seated on a gasket 95 placed on the member 33, and held tightly thereto by a series of bolts 97. This dome is imperforate, so that so long as a tight joint is maintained by the gasket 95, any seepage of fluid from the interior of the condenser along the shaft 41 can continue only until the pressure inside the dome is built up to the same pressure as that inside the condenser body, whereupon there will be no further leakage.

To hold the shaft 41 against turning in the sleeve 29 (when a soldered or brazed joint is not used) the upper end of the shaft 41 may be provided with a nut 101 screwed down tightly onto a washer 103 contacting with the upper end of the sleeve 29 and pressing downwardly upon it, while upward movement of the shaft 41 in response to this pressure is prevented by the enlargement 49 which lies against the bottom end of the sleeve 29. Thus the shaft is firmly clamped against turning. At the same time resilient, radial arms 105 may extend outwardly from the annular washer 103 at intervals around its periphery and downwardly to make contact with the metal member 33, as shown in the drawing, thus establishing a good electrical connection through the washer 103 and arms 105 (together constituting what may be termed a spider) from the shaft 41 to the member 33. A lock nut 107 overlies the nut 101 to prevent it from loosening.

The electrical connection or lead to the rotor side of the condenser may be made in any suitable way. Since the metal member 33 and dome 93 are electrically connected to the rotor shaft 41, a convenient place to connect the conductor is at the top of the dome 93, which may be provided with a stud 111 onto which is screwed a nipple nut 113 having screw threads on the exterior of its upper end and a tapered surface on the interior, for receiving a conical shaped collet 115 and a clamp nut 117 which together serve to clamp tightly on a cable, rod, or wire 119 constituting the conductor.

The electrical connection to the other or stator side of the condenser may be made at any suitable point, such as through the cable, rod, or other conductor 121 having a clip 123 soldered or otherwise secured thereto, which clip is bolted with the aid of a nut 125 to a lug 127 on the base or bottom portion 59 of the condenser. This may be one of a series of bolts which holds the condenser on any suitable supporting surface.

If desired, a flashover gap may be formed by a bolt 131 adjustably threaded through the lip of the metal member 33 and held in its adjusted position by means of a clamp nut 133. The lower end of this bolt 131 is adjusted to such distance from the upper edge of the metal casing 21 that in the event of an overload, flashover will occur between the bolt 131 and the casing 21 before there is a flashover between the plates inside the condenser, thus saving the interior of the condenser from possible damage.

The member 31 may be of small size serving merely to seat against the gasket 37, but preferably is extended to a larger annular size, as shown in Fig. 1, so as to constitute a plate on the rotor side of the condenser, increasing the capacitance thereof. The outer edge of the plate may be formed with a cylindrical flange 129 extending some distance along the casing 21 in an axial direction, but spaced therefrom, to increase the capacitance still further if desired, and also to distribute the electrostatic flux more evenly in the porcelain portion 25 and produce a better gradient therein.

As a result of the various details of construction above disclosed, a condenser of relatively high capacitance for its size and weight is provided. Its weight is relatively small since most of the metal parts are small and can be made of light metal, and the only porcelain part required is the single member 25, 27. The dished shape of the flange 25 of this porcelain member enables it to withstand any reasonable internal pressure within the condenser, even when the flange 25 is relatively thin, so that this porcelain member can be made of relatively light weight.

The thinness and light weight of the porcelain element 25, 27, which is made possible by the dished shape thereof, is also important for another reason beside the saving of weight. There is inevitably a certain amount of dielectric loss in material of this kind, which causes a certain amount of heating of the porcelain in service. When the walls are relatively thin, the heat is better carried away than if the porcelain were of thick, massive construction. Also it is preferable to make the porcelain element so that the tubular portion 27 is entirely or mainly above the outwardly extending flange 25, so that the tubular portion 27 will be exposed directly to the surrounding air, which can circulate in contact with substantially the whole outer surface of the flange 25 and the tubular portion 27 and serve rapidly to dissipate and carry away the heat generated in these parts under service conditions. One of the important advantages of the present insulator construction is the free circulation of air in such a way as to contact with a large surface area of the porcelain element, and no part of the porcelain element is very far removed from the surface with which the freely contacting air circulates, so that heat generated in any part of the porcelain need travel through only a relatively small thickness of the porcelain in order to reach an air cooled surface thereof.

Figures 4, 5:
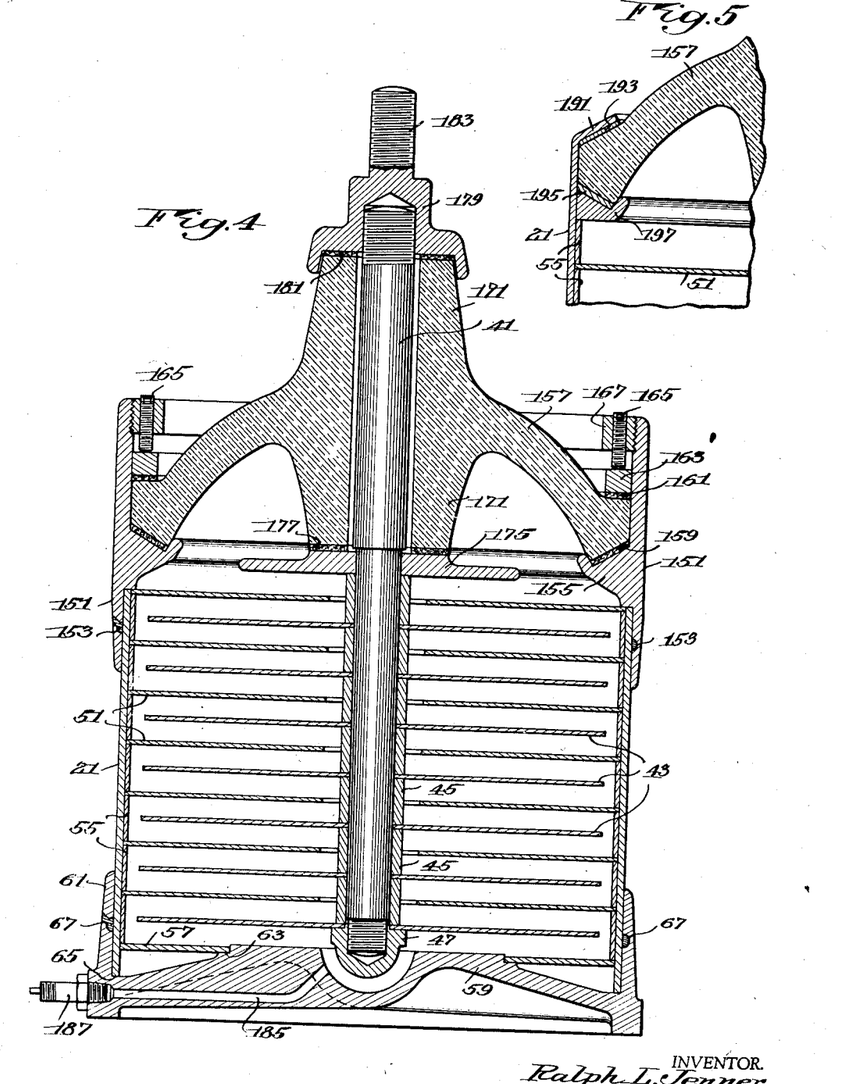
Fig. 4 is a vertical section taken centrally through a condenser in accordance with still another embodiment of the present invention.
Fig. 5 is a fragmentary view similar to the upper left corner of Fig. 4, illustrating a modified form of joint.

In Fig. 4 of the drawings there is shown a somewhat similar condenser, designed primarily for sub-atmospheric pressure within the condenser. A relatively high vacuum makes a reasonably good dielectric between the spaced plates of a condenser, but it has heretofore been difficult to seal a condenser sufficiently tightly to maintain a vacuum over a long period of time. It is believed that the present invention solves this difficulty, and permits the use, in a practical way, of a high vacuum as a dielectric for a condenser.

In the condenser of Fig. 4, the metal casing or shell is indicated as before by the numeral 21. In this casing are the stator plates, again indicated by the numeral 51, held between spacing sleeves 55, all as in the construction previously described. The shaft 41 of the condenser carries the rotor plates 43 spaced from each other by the spacers 45 held by the nut 47 screwed on the bottom of the shaft, all of which parts may be the same as before. As in the previous case, there is a tension ring 57 originally of frusto-conical or dished shape, and the bottom member 59 has, as before, a flange 61 which encircles and slides along the casing 21 until the edge of this casing comes in contact with the shoulder 65 on the bottom plate, whereupon the flange 61 is permanently and hermetically secured to the casing 21 as by means of solder poured into the annular groove 67, as previously described, the tension ring 57 being deformed during the assembly operation so as to hold the spacers 55 constantly under compression.

The main difference between this condenser and the condenser described in connection with Figs. 1 and 2, is that instead of bending the top of the casing over as was done at 23 in Fig. 1, and having the porcelain element pressed upwardly on its inturned flange, the condenser of Fig. 4 is provided at the upper edge of the casing 21 with a metal ring 151 encircling the casing 21 and brazed or soldered thereto, to form a hermetical seal, as by means of solder poured into the annular solder groove 153, and this member 151 is provided with an inwardly extending flange 155 which forms a seat for the lower outer edge of an upwardly dished porcelain flange 157. As in the construction previously described, a tight joint may be maintained between the porcelain 157 and the metal 155 by soldering the metal 155 directly to a metallic coating or a metallic glaze on the porcelain, or by the use of an interposed gasket. In Fig. 4, a gasket is shown by way of example, at 159.

When a gasket, rather than a soldered joint, is employed, it is preferable to use also a second gasket 161 overlying the marginal portion of the porcelain member 157, which gasket is pressed downwardly onto the porcelain member by an annular metallic ring 163 urged downwardly by jack screws 165 screwed through a metallic ring 167 which has its circumference threaded and engaged with internal threads at the upper edge of the metal member 151. These jack screws 165 maintain both baskets 159 and 161 under compression, keeping a tight joint, which is aided by the fact that the gasket 159 is arranged at an oblique angle as shown in Fig. 4, so that as the porcelain member 157 is forced down by the jack screws, a wedging action on the gasket 159 takes place, conducive to a tighter joint than if this gasket were in a plane perpendicular to the force exerted by the jack screws. If the porcelain element is soldered to the metal member 151 then the overlying gasket 161 and the ring 163 and jack screws 165 can be omitted.

To provide a bearing for the rotor shaft 41, the porcelain element is formed with an axial tubular portion at its center, as indicated at 171. Where there is no limitation upon overall height of the condenser, it is advisable to have practically all of this tubular portion 171 extend upwardly above the dished portion 157 of the porcelain element, to get greater cooling effect by circulating air, as previously explained. Where, however, it is desirable to construct a condenser with a low overall height, then part of the tubular portion 171 may extend downwardly within the dished portion 157 of the porcelain element, as indicated in Fig. 4. Maximum economy of space is provided when the lower edge of the tubular portion 171 is at approximately the same elevation as the lower edge of the outer marginal portion of the dished flange 157, which is the relationship illustrated in Fig. 4. But from what has already been said about the cooling effect of the circulating air, it will be seen that this economy of space is gained at the expense of some loss of efficiency in cooling, and wherever space economy is not needed, it is desirable to have less of the length of the tubular portion 171 within the condenser (that is, below the general shape of the wall 157) and more of the length thereof outside of the condenser (above the wall 157) where the freely circulating air can get at it.

With this condenser, the sealing of the shaft 41 with relation to the porcelain element may be the same as that indicated in Fig. 1, especially if it is desired to have the condenser adjustable or variable, or if preferred a somewhat simpler construction may be used, especially if the condenser has a fixed capacitance and no adjustment is desired. Such a simpler construction may omit the metal sleeve 29 used in the previously described form, and the shaft 41 may run directly through the axial opening in the porcelain, as shown. A thick, sturdy plate 175, which really forms the topmost one of the rotor planes but also serves to distribute flux in the porcelain, is mounted on the shaft beneath the lower end of the porcelain element and bears upwardly against an interposed gasket 177 (although here, again, the metal may be soldered directly to the porcelain, if desired). The shaft is pulled upwardly by a fixture 179 screwed onto threads on the upper end of the shaft and bearing downwardly onto a gasket 181 between this fixture and the upper edge of the porcelain element. As the fixture 179 is screwed tight it tends to draw the shaft up, but this is resisted by the member 175 bearing against the gasket 177, for any upward movement of the shaft relatively to the member 175 is prevented by means of the spacers 45 and nut 47.

When maximum gas tightness under varying temperature conditions is desired, the rotor spacing sleeves 45 may be made of metal having a higher coefficient of thermal expansion than the shaft 41, and sufficiently higher so that the expansion in the sleeves 45, plus the expansion in the thickness of the rotor plates 43 and of the plate 175, plus the axial expansion of the tubular porcelain part 171, for a given temperature change, exactly equals the expansion in the length of the shaft 41 from the fixture 179 to the nut 47, for the same temperature change, the shoulder on the shaft 41 being cut back sufficiently far from the plate 175 so that it does not press directly against the plate when the temperature varies. Then the joints 177 and 181 will always remain at the same degree of tightness regardless of temperature changes. If necessary to produce this exact balance of expansion, some of the spacing sleeves 45 may be made of one metal and others made of another metal having a different coefficient of expansion. A suitable arrangement of materials for any given length of shaft and given number and spacing of rotor plates, can easily be worked out by any physicist or other person skilled in this art, with the aid of standard published tables of thermal expansion coefficients, such as those appearing on pages 1241 to 1247 of the "Handbook of Chemistry and Physics," edited by Hodgman, 21st edition, published 1936.

The upper end of the fixture 179 is provided with a threaded stud portion 183 onto which may be screwed a nipple nut 113, with collet 115 and clamping nut 117, the same as shown in Fig. 1, for the purpose of attaching one of the electrical leads or conductors, the other of which may be bolted to a lug at the bottom of the casing just as in Fig. 1.

The interior of the condenser may be exhausted to the desired degree of vacuum through a duct 185 having any suitable valve therein, such as the ball valve 77 controlled by a screw 79 as in Fig. 1, or a valve of the type commonly used in pneumatic tires of vehicles, which valve is indicated in general at 187 in Fig. 4. Where the interior of the construction is to be maintained at sub-atmospheric pressure, then, of course, a tire type of valve would have to be faced in the opposite way from the usual way it is placed in a pneumatic tire, so as to prevent ingress of air rather than to prevent egress thereof.

An alternative arrangement for securing the porcelain element to the metal casing, in the sub-atmospheric or vacuum type of condenser, is indicated in Fig. 5. Here, instead of providing the upper edge of the casing 21 with a separate metal member 151, the upper edge of the casing is merely bent or flanged inwardly as at 191, somewhat similar to the inwardly extending flange 23 in Fig. 1. The dished flange 157 of the porcelain element is soldered to the flange 191 as by means of solder 193, and may be soldered also, by means of solder 195, to the metal ring 197 placed within the casing 21 but which need not be screwed or otherwise directly fixed thereto. The upward compressive force exerted by the stator spacers 55 by reason of the force of the tension ring 57, will serve to resist the downward thrust caused on the ring 197 by the air pressure acting downwardly on the porcelain element, when there is a vacuum or partial vacuum within the condenser.

The condensers described in connection with Figs. 4 and 5 are assembled in the same way as indicated with reference to Fig. 1; that is, the porcelain element is properly secured to the condenser casing, which is turned to an upside down or inverted position, and the plates are successively inserted and secured in place, after which the bottom member is forced downwardly onto the casing, deforming and tensioning the ring 57, and is soldered or brazed permanently in place.

If desired, the condensers of Figs. 4 and 5 may be provided with an external flashover gap formed by a stud or bolt suitably fastened to the fixture 179, similar to the stud 131 in Fig. 1.

Figures 6, 7:
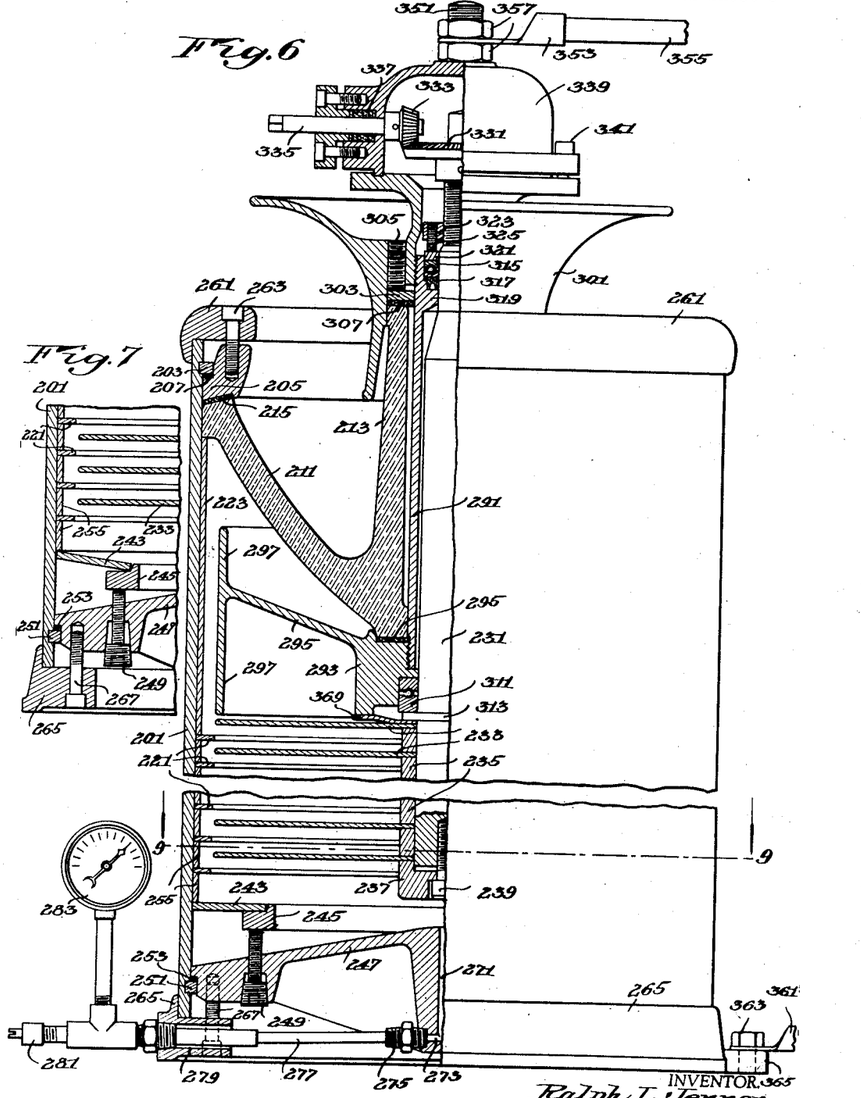
Fig. 6 is a view of a condenser in accordance with still another embodiment of the invention, illustrating it partly in elevation and partly in central vertical section.
Fig. 7 is a view similar to a fragment of the lower left corner of Fig. 6, illustrating certain of the parts in a position which they assume at an intermediate stage of the assembly of the condenser.

In Figs. 6 and 7 of the drawings there is illustrated another form of casing which may be used for larger sized condensers. Here, the casing is indicated at 201 and may be in the form of a hollow cylinder of aluminum or other desired metal. Near the upper end of the cylinder is an annular internal groove into which a split ring 203 may snap, to hold the ring against movement axially of the cylinder. The ring forms a seat for a second ring 205 extending around the inner perimeter of the cylinder 201, and a gasket 207 may be interposed between the parts 203 and 205, if desired, or the ring 205 may be soldered or brazed to the ring 203 or direct to the casing 201.

The dielectric element which supports the rotor parts of the condenser from the stator parts thereof, is made of porcelain or other suitable dielectric material, and comprises a flange 211 dished downwardly and corresponding substantially to the flange 25 of the construction shown in Fig. 1, and a tubular flange 213 preferably integral with the flange 211 and corresponding substantially to the tubular portion 27 in the form shown in Fig. 1, this flange 213 having a central opening extending axially with respect to the condenser casing 201. Just as in the forms of construction previously explained, the porcelain flange 211 may be soldered to the metal ring 205, or a gasket may be interposed between the two for sealing purposes. For the sake of example, a gasket is here shown, illustrated at 215. When the gaskets 207 and 215 are used, they preferably are both of a type which, when compressed, tends to expand or flow in all available directions. Thus the upward pressure of the porcelain element 211, causing compression of the two gaskets, causes both of these gaskets to tend to flow edgewise so that they come in tight sealing contact with the metal shell 201 and make a gas tight joint at these points.

As in the previous embodiment, the stator plates 221 are formed so that at least parts of their peripheries (and preferably the whole of their peripheries) fit snugly against the inner surface of the shell 201, and the edges of the plates are held by spacing rings or sleeves 223 and 225 like the previously described spacing rings 53 and 55, respectively. Also as in the previously described embodiments, there is a central shaft 231 passing through the bore in the tubular portion 213 of the porcelain element, and on this shaft 231 are mounted the rotor plates 233 interspersed with the stator plates 221 and held in proper spaced relation by spacing sleeves 235 and a cap 237 held on the end of the shaft 231 by suitable screw threaded means such as the headed screw 239.

This condenser is assembled in a manner similar to that already described. It is turned upside down, the bottom (now forming the top) being left open, and the plates and their spacers are successively inserted through the open end which is now the top. When this has been completed, a tension ring 243 (similar to the tension rings 57 previously described) is inserted and laid against the edge of the lowermost spacing sleeve 225, which is now the uppermost sleeve in this inverted position of the parts. This tension ring 243, like the ring 57 previously described, is initially in the frusto-conical or dished form shown in Fig. 7. Then a jack ring 245 is laid in place on the top of the ring 243. Then the bottom member 247, which has a circular periphery fitting snugly within the shell 201, is inserted in what is now the top opening of the shell and is moved downwardly to a position close to the jack ring 245, the jack screws 249 at this time being absent or at least being backed off sufficiently far so that the bottom plate may be moved down far enough to clear a circumferential groove formed around the inner surface of the shell 201 near the bottom edge thereof (that is, near the top edge in the inverted position).

Figures 8, 9, 10, 11:
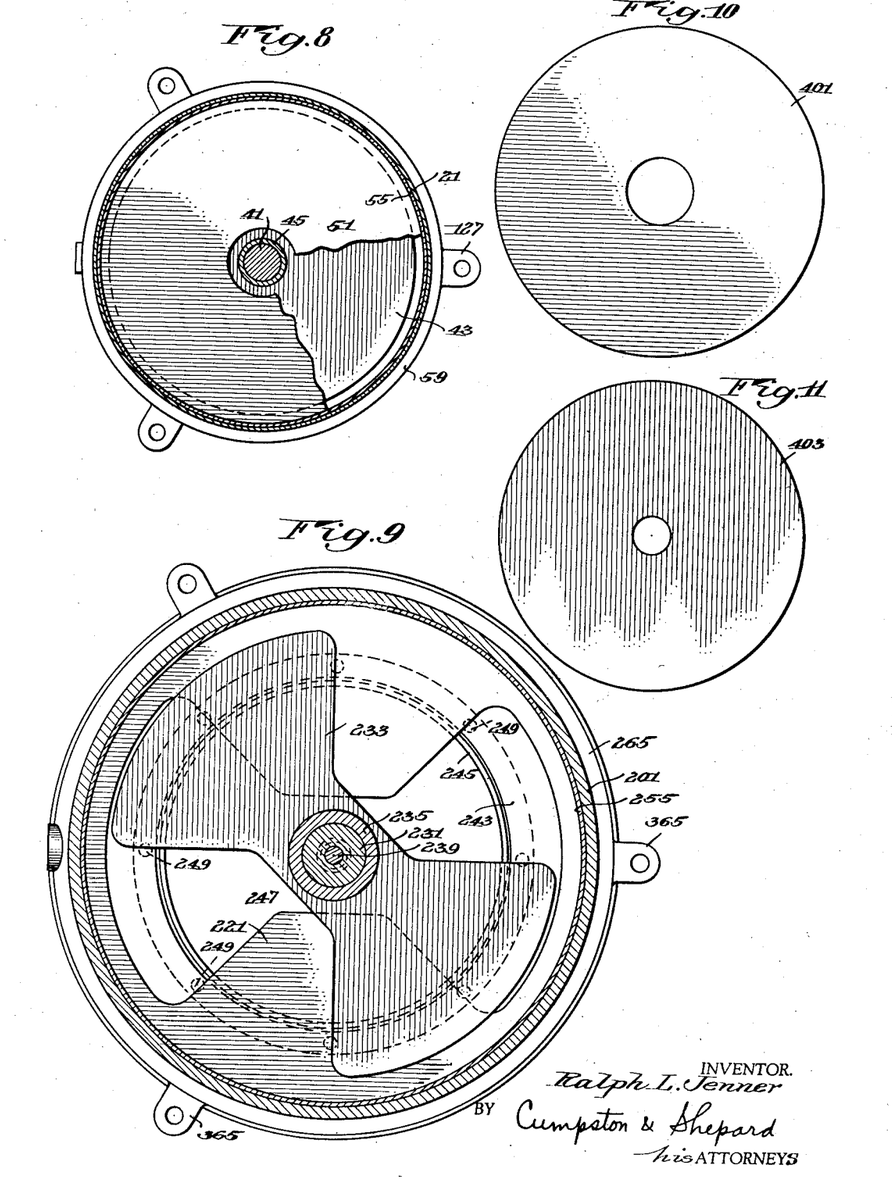
Fig. 8 is a horizontal section taken substantially on the line 8—8 of Fig. 1.
Fig. 9 is a horizontal section taken substantially on the line 9—9 of Fig. 6.
Fig. 10 is a plan of one form of condenser stator plate according to the invention.
Fig. 11 is a plan of one form of rotor plate according to the invention.

Then a split ring 251 is snapped into this circumferential groove, a gasket 253 being interposed between the ring and a shoulder on the bottom member 247. Then the bottom member is brought into bearing relation upon the gasket 253, and the jack screws 249 (there being a series of such screws arranged in a circle in the bottom 247, as shown in Fig. 9) are screwed up to press against the jack ring 245 and to cause it, in turn, to press against the tension ring 243 and deform this tension ring from its initial dished form of Fig. 7 to its final and approximately plane form of Fig. 6. If it is preferred to make a permanent hermetical joint at the bottom, then instead of using the gasket 253 the bottom member 247 is brazed or soldered directly to the shell 201.

Assuming now that the condenser has been turned back from its upside down or inverted position to its normal upright position as shown in Fig. 6, so that the terms "top" and "bottom" apply to the normally erect position, it is seen that the effect of screwing up the jack screws 249 tensions the ring 243 so that this ring presses upwardly on all the spacers 255 and 223, holding the stator plates 221 firmly in place and at the same time causing upward pressure on the porcelain element 211, since the upper edge of the topmost spacing sleeve 223 contacts with a shoulder on the porcelain element. This upward pressure on the spacing sleeves holds the porcelain element tightly against the ring 205 (or against the interposed gasket 215, if such a gasket is used) and also holds the ring 205 tightly against the gasket 207 bearing on the upper snap ring 203.

The reaction of the pressure of the tension ring 243 bears downwardly on the jack ring 245 and is transmitted through the jack screws 249 to the bottom 247, tending to move the bottom member downwardly and thus compressing it against the gasket 253 which bears on the lower snap ring 251. Hence the tension produced in the tension ring 243 holds all of these parts snugly. Internal fluid pressure within the condenser has the effect of causing increased pressure upon the gaskets 207, 215, and 253, increasing the effectiveness of the seal, rather than tending to pull the elements away from the gasket as is the case in certain prior constructions.

If desired, a top ring of annular form may extend around the top of the condenser casing and overlap the upper edge thereof, such a ring being indicated at 261, and may be secured to the ring 205 by an annular series of screws 263. Likewise a bottom ring 265 (Fig. 7) may be employed, beneath the bottom edge of the shell 201 and extending up somewhat around the outside of the shell, and may be held to the bottom member 247 by an annular series of screws 267. Since the tension of the ring 243 and any internal pressure within the condenser both tend to hold the top closure 211 and the bottom closure 247 in tightly sealed position, these top and bottom rings 261 and 265 are not essential for sealing purposes, but it is frequently desirable to use them since the ring 261 holds the ring 205 in place in the early stages of the assembling operation and thus aids convenient assembly and provides a better appearance for the top edge of the condenser casing, while the bottom ring 265 provides a stronger and more satisfactory base for supporting the condenser than that provided merely by the bottom edge of the shell 201.

When the condenser is to be filled merely with air at atmospheric pressure, no special fitting connections are needed. If, however, it is desired to fill the condenser with any material other than air, or to fill it with air at more than atmospheric pressure, then a fitting connection can be provided such as a duct 271 extending downwardly through a thick boss at the center of the bottom plate 247 and leading into a lateral duct 273 connected by a nipple 275 to a pipe or conduit 277 extending laterally through an opening 279 in the bottom ring 265. This pipe 277 may be provided with any suitable valve, such as any of the valves previously described, such a valve in general being indicated at 281. It may also be provided with a pressure gauge 283 to indicate the pressure maintained within the condenser.

The shaft 231 may be mounted in the tubular portion 213 of the dielectric support in various different ways, depending somewhat upon the type of condenser. The features thus far described with reference to Fig. 6 may be employed, of course, for a fixed condenser, an adjustable condenser, or a variable condenser, for the exact manner of mounting the shaft 231 in the tubular dielectric portion 213 is not dependent upon the way in which the plates are held within the shell or casing, nor upon the way in which the top dielectric closure and the bottom metallic closure are held in place in the shell.

If the condenser is to be of the fixed type, the shaft 231 may be mounted in the tubular member 213 in permanent fixed position with the same simplified arrangement shown, for example, in Fig. 4. When the condenser is to be either of the fixed type or of the adjustable type, a shaft mounting arrangement like that shown in Fig. 1 may be employed. When the condenser is to be of the variable type, the shaft mounting may still be of a construction very similar to that shown in Fig. 1, but preferably with some additional features for ease of turning the shaft to vary the capacitance of the condenser while maintaining the interior of the condenser tightly sealed. The preferred form of variable condenser shaft mounting is here indicated in Fig. 6, by way of example, and those skilled in the art will readily understand that the simpler forms of mounting above mentioned could be substituted if desired.

In this variable condenser mounting here shown as an example, there is a metal bearing tube 291 extending through the bore of the porcelain tubular element 213 and corresponding in general to the metal bearing tube 29 of the form in Fig. 1. The bottom of this tube is threaded and is screwed into a metal member 293 (corresponding in general to the member 31 in Fig. 1) which, by reason of tension in the tube 291, is constantly pulled upwardly against the bottom end of the porcelain element, either being soldered directly thereto or having an interposed sealing gasket such as indicated at 295. Since this metal member 293 is on the rotor side of the electric circuit, the capacitance of the condenser may be somewhat increased, if desired, by forming this member so that it has an outwardly extending flange 295 terminating in a cylindrical flange 297 close to the plates somewhat inwardly from the shell 201 and spacing sleeve 223, these flanges also serving to give better distribution of flux in the dielectric portion 211. If the extra capacitance and the flux distribution thus provided are not desired, the portions 295 and 297 may be omitted, leaving the member 293 to perform only its function of holding the bottom end of the bearing tube 291.

A metal member 301, corresponding in general to the member 33 in Fig. 1, is internally threaded and screwed onto the exterior of the upper end of the bearing tube 291. For small sized condensers, the member 301 may bear against the top edge of the porcelain element 213 (or against an interposed gasket) with a degree of pressure depending on the extent to which this member 301 is screwed onto the tube 291, just as in the case of Fig. 1. But for larger sized units, it is frequently advisable to shape the member 301 so that it fits snugly around the outer periphery of the porcelain element 213, but is spaced somewhat above the top edge of the porcelain element. In this space is mounted a metal ring 303, and a series of jack screws 305, arranged at suitable intervals around a circle, are threaded through the member 301 and bear downwardly upon this ring 303 and press it against the top edge of the porcelain member 213, or against an interposed gasket 307 or soft fiber washer to distribute the pressure. The degree of tension in the member 291, and the degree of compressive force exerted by the member 293 on the bottom end of the porcelain element, are regulated by screwing down the jack screws 305 to a greater or lesser extent.

For ease in turning the shaft 231, it is mounted according to the present invention in ball bearings. The lower bearing is indicated in general at 311, and is seated between an annular flange 313 formed on the shaft 231, which lies just below the bearing, and a shoulder on the member 293, which overlies the bearing. The upper ball bearing is indicated at 315, and immediately below it is a U-shaped sealing gasket 317 which supports the ball bearing and which, in turn, is supported by an inwardly extending flange 319 on the bearing tube 291. The opening between the legs of the gasket is faced downwardly. Above the ball bearing 315 is a ring 321 fitting loosely around the shaft 231. Another annular ring 323 is internally screw threaded and is screwed onto external threads on the upper end of the shaft 231, so as to be in permanently fixed position thereon. A series of jack screws 325, arranged at intervals around the ring 323, are threaded through this ring and bear downwardly upon the top of the loose ring 321.

The pressure on the ball bearings 311 and 315 and on the gasket 317 is controlled by the jack screws 325. As these screws are screwed down tighter, they press the loose ring 321 down tighter upon the top of the ball bearing 315, pressing this ball bearing down tighter on the U-shaped gasket 317 and pressing the gasket tighter against its seating shoulder 319. The increased pressure on the gasket tends to spread the legs thereof, pressing one leg inwardly tightly against the shaft 231 and the other leg outwardly tightly against the bearing tube 291, to produce a gas tight seal. The reaction of this pressure tends, of course, to raise the ring 323 through which the jack screws 325 are threaded, and this upward force is transmitted to the shaft 231, tending to raise the shaft and thus tending to bring the shoulder 313 on the shaft up against the bottom of the ball bearing 311, producing an upward pressure on this ball bearing.

Internal fluid pressure within the condenser shell, in seeking escape therefrom, may pass beyond the ball bearing 311 and up through the annular space between the shaft 231 and the bearing sleeve 291, but can pass upwardly no farther than the sealing gasket 317. Any fluid pressure which does get to this sealing gasket will enter the hollow space between the legs of the gasket and tend to separate these legs with even greater force, thus increasing the sealing effect of the gasket with increasing fluid pressure.

To vary the capacitance of the condenser, the shaft 231 may be turned by any suitable handle or contrivance, but preferably by an arrangement furnishing still greater assurance against escape of fluid pressure, in case any fluid leaks past the gasket 317. In the preferred form, the shaft 231 is provided near its upper end with a beveled gear 331 meshing with a beveled pinion 333 on a small shaft 335 passing through a gland or stuffing box 337 in a metal dome 339 tightly clamped down on a flange of the member 301 by an annular series of bolts 341. The dome 339 is imperforate except for the gland through which the shaft 335 extends, and is seated against the metal member 301 (with an interposed gasket, if desired) sufficiently tightly to be in gas tight relation thereto. Hence if there should be any leakage past the gasket 317, fluid pressure will build up within the dome 339 until it equals the pressure within the condenser casing, and then there can be no more leakage.

It is advantageous to have the shaft 335 of relatively small diameter, smaller than that of the main shaft 231, for a shaft of relatively small diameter can be packed more tightly, without undue frictional resistance to turning, than a shaft of larger diameter.

The power lines may be attached to any convenient part of the condenser. For example, on the top of the dome 339 may be an integral screw stud 351, to which a clip 353 on the cable or conductor rod 355 is attached by means of nuts 357. Or a nipple nut the same as the nut 113 in Fig. 1 of the drawings may be screwed onto this stud 351 and the electrical connection made in the same way as in Fig. 1. On the stator side of the condenser, the clip 361 attached to the electrical circuit member may be bolted by a nut 363 to one of the hold down lugs 365 on the base member 265.

A resilient spider 369, similar to the spider 103, 105 in Fig. 1, is preferably interposed at any suitable point between the rotating parts and the fixed metal parts of the rotor side of the condenser, to provide a good electrical connection without current having to pass through the ball bearings. For the purpose of illustration, this spider 369 is here shown as extending around the shaft 231 between the topmost rotor plate 233 and the shoulder 313 on the shaft, and the outwardly extending spider arms bear against the under side of the metal member 293, forming electrical contact therewith. From here, the current flows along the member 291 to the member 301, thence to the member 339 and to the electrical connection 355, this path of flow from the spider 369 onward being entirely through parts which are fixed relatively to each other and which thus provide good electrical connections.

The metal member 301 may be provided with a stud like the stud 131 in Fig. 1, to furnish an external flashover gap, but this has been omitted from Fig. 6 to simplify the drawings, since its use in the Fig. 6 construction will be perfectly apparent from Fig. 1.

If the condenser is to be used at sub-atmospheric pressures rather than at atmospheric or super-atmospheric pressures, exactly the same construction may be employed, save that the dielectric flange 211 would be dished upwardly rather than downwardly and mounted in the manner shown in Fig. 4 or in Fig. 5, for example.

As already explained, the various features of the way the casing or shell and associated parts are put together, and the way the rotor plates and stator plates are held within the condenser, are matters which are not dependent upon the type of condenser, and can be used equally well for fixed condensers, or for adjustable condensers, or for variable condensers. The shape of the plates employed, and the kind of bearing or fastening provided for the main shaft, are the principal things to be altered when one desires to build an adjustable condenser or a variable condenser rather than a fixed condenser. No difference need be made in the casing or shell design, or the manner of holding the top porcelain closure and bottom metal closure, or the manner of holding or supporting the plates, all of which features are equally applicable to all three types of condensers.

When a fixed condenser is to be built, all of the pairs of plates therein (considering a pair as one rotor plate and one stator plate) can conveniently be made of a form constituting what may be called a fixed capacitance pair; that is, a pair of plates which have a fixed capacitance regardless of turning movement of one plate relatively to the other about their common central axis. But it will be clear that when adjustable or variable condensers are to be made, all of the pairs of plates may be but need not be variable pairs, for the condenser may employ some pairs of fixed capacitance plates along with some pairs of variable capacitance plates, depending upon the degree or extent of variability desired.

According to the present invention, a simple form of plates constituting a fixed capacitance pair is provided. For such a pair, the stator plate may be simply a circular disk with a hole in the center, as shown at 401 in Fig. 10. The outer diameter of the disk is such that it will fit reasonably snugly within the condenser shell or casing, so that the extreme marginal edges may be clamped between the spacing sleeves previously mentioned. The diameter of the central opening through the disk is such that the edges thereof will be spaced the required distance from the central shaft and from the spacing sleeves mounted on this shaft.

The other element of the fixed capacitance pair, namely the rotor plate of this pair, is likewise a circular disk with a hole in the center, as indicated at 403 in Fig. 11. Here, the hole in the center is of the proper diameter to fit reasonably snugly upon the central shaft of the condenser, so that the marginal edge immediately around this central hole will be clamped between the spacing sleeves mounted on the shaft. The diameter of the outer edge of the plate is of such a size as to space the outer edge the required distance inwardly from the shell of the condenser and from the spacing sleeves which extend around the inside of the shell.

It is seen that an extremely simple pair of plates of fixed capacitance has been provided. The turning of one plate relatively to the other about their central axis has no effect on the capacitance.

The present invention also provides improved forms or shapes of plates for forming a variable capacitance pair. In the preferred form of the present invention, these plates are so shaped that they may be held in the condenser casing or shell in exactly the same manner as the fixed capacitance pair of plates, and so shaped that the two plates of one pair can be cut from a single circular disk, with consequent decrease in cost. The fact that the plates of a variable pair can be held in exactly the same way as the plates of a fixed pair is advantageous for it permits the casings and the spacing sleeves of condensers to be manufactured on a quantity production basis, without regard to the fixed or variable nature of the plates to be used therein, and the different kinds of condensers can be made from exactly the same casings and associated parts, merely by assembling the desired different types of plates within the casings.

Figure 12:
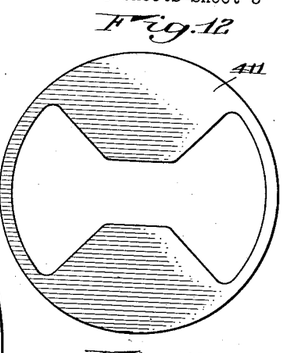
Fig. 12 is a plan of another form of stator plate according to the present invention.
Figure 13:
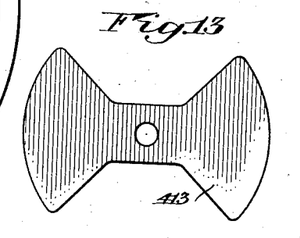
Fig. 13 is a plan of another form of rotor plate according to the present invention.
Figure 14:
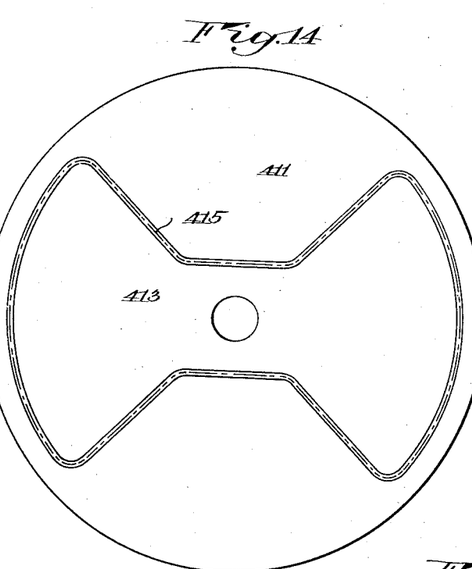
Fig. 14 is a view illustrating how the rotor plate of Fig. 13 and the stator plate of Fig. 12 may both be cut economically from a single piece of material.

In the form shown in Figs. 12, 13, and 14, the stator plate of the variable pair is indicated at 411 in Fig. 12 and the rotor plate at 413 in Fig. 13. Fig. 14 illustrates graphically how both plates are formed from a single disk of only the diameter required to fit within the condenser casing or shell, by cutting such a disk along the dash line 415. The plates of this pair may be referred to in general as "butterfly" types of plates for the outwardly flared ends of the rotor plate 413 and of the opening left in the stator plate 411 give somewhat the impression of butterfly wings.

When plates of this butterfly type are assembled on a common axis and spaced from each other in an axial direction, it is apparent that minimum capacitance is provided when the rotor plate is directly alined with the outline of the opening in the stator plate; that is, when the rotor plate may be thought of as having been not rotated with respect to the stator plate after it was cut therefrom, but simply moved axially a short distance with respect to the stator plate. Maximum capacitance is provided when the rotor plate is turned 90° from this minimum position, so that the wide wing portions of the rotor plate directly overlie the wide portions of the stator plate. Any desired capacitance between these maximum and minimum values may be obtained by turning the rotor plate more or less with regard to the stator plate.

Figures 15, 16, 17:
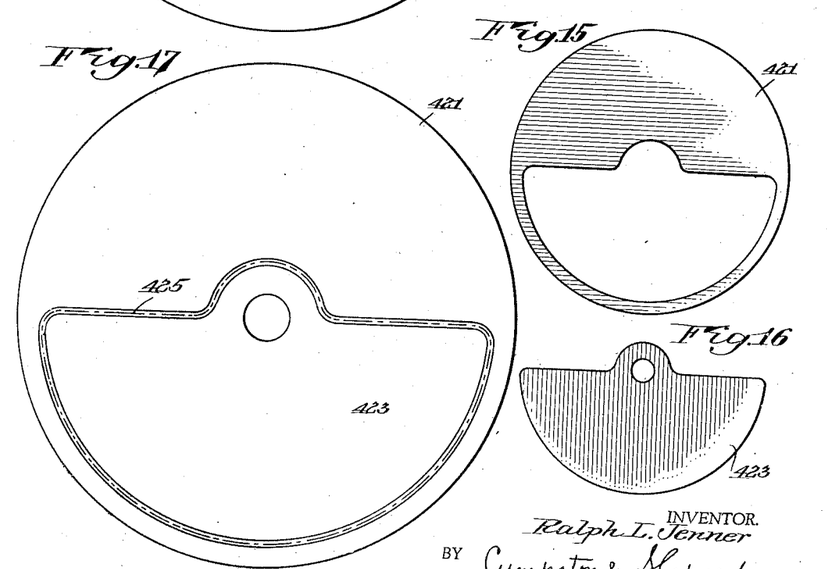
Fig. 15 is a plan of still another form of stator plate according to the present invention.
Fig. 16 is a plan of still another form of rotor plate according to the present invention.
Fig. 17 is a view illustrating how the rotor plate of Fig. 16 and the stator plate of Fig. 15 may both be cut economically from a single piece of material.

Still another embodiment of plates forming a variable capacitance pair is shown in Figs. 15, 16, and 17 of the drawings. The stator plate is indicated at 421 in Fig. 15, and the rotor plate at 423 in Fig. 16. Fig. 17 illustrates diagrammatically how both plates may be cut from a single circular disk of the proper diameter to fit within the condenser casing, by cutting such a disk along the dash line 425. The resultant plates may be referred to as the semi-circular type, for the rotor plate 423 itself, as well as the opening left in the stator plate, are of approximately semi-circular form, except for the small bulge on the straight or diametrical side, needed to provide metal on the rotor plate to extend around all sides of the shaft on which it is mounted, and to provide clearance of the stator plate from the shaft.

With plates of this semi-circular type, the capacitance is at a minimum, of course, when the rotor plate directly overlies the opening in the stator plate, and at a maximum when the rotor plate is turned 180° from this position so that it directly overlies the solid part of the stator plate. Any desired capacitance between these maximum and minimum values may be obtained by turning the rotor plate more or less with regard to the stator plate.

In Fig. 8 of the drawings, the horizontal cross section through the condenser of Fig. 1, the condenser plates which appear in this view are of the fixed capacitance type indicated in Figs. 10 and 11. In Fig. 9 of the drawings, which is the horizontal cross section through the condenser of Fig. 6, the condenser plates which appear in this view are of the butterfly variable type shown in Figs. 12 and 13. These showings of specific forms of plates in connection with the condensers of Figs. 1 and 6 should be understood to be merely for the sake of example. As already stated, the form of plate used is not dependent upon the form of casing construction employed, and it is not intended to limit the usefulness of the various forms of casing constructions disclosed, to the particular forms of condenser plates which happen to be shown associated with those casings, merely as examples. It must be clearly understood that each of the forms of casing construction herein disclosed may be used equally well with each of the different forms of condenser plates herein disclosed.

As previously mentioned, the present invention includes, as one of its features, the maintenance of the interior of the condenser casing at atmospheric, super-atmospheric, or sub-atmospheric pressure, and includes broadly the use of any desired fluid dielectric (liquid or gas) within the condenser casing. One valuable feature of the present invention is the provision of a condenser casing construction which is made so tight as to prevent entrance of dust, when the condenser is operated at atmospheric pressure, and so tight as to maintain the desired pressure within the casing, when the condenser is operated at sub-atmospheric or super-atmospheric pressure.

Among the fluid dielectrics which may be employed, according to the present invention, may be mentioned insulating oil as a liquid dielectric. As gaseous dielectrics may be mentioned nitrogen, carbon dioxide, butane, and Freon (dichlorodifluoromethane and its associated group).

The pressures employed for the fluid dielectric may be varied to a great extent, without departing from the present invention, depending upon the characteristics of the fluid used, the dielectric strength desired, and the pressure for which the condenser casing or shell is designed. When sub-atmospheric pressures are employed, the lower limit, of course, is an absolute vacuum or as nearly an absolute vacuum as can be attained in a practical way. When super-atmospheric pressures are employed, pressure may run up to any reasonable amount, for example 200 or even 300 pounds per square inch. Good results have been obtained with a condenser filled with nitrogen at about 225 pounds per square inch.

The material of which the metal parts of the condenser is constructed, may also be varied without departing from the invention. The use of non-ferrous metals is usually desirable, to avoid losses due to eddy currents. In smaller condensers, such as those indicated in Figs. 1 and 4, most or all of the metal parts may be made conveniently of brass, bronze, or copper. In larger condensers, such as that indicated in Fig. 6, where the weight of the metal parts if made of these materials might be excessive, most of the metal parts, particularly the larger ones, may be of aluminum. In some instances, especially where the condenser is to be used in radio service, the condenser plates and other metal parts can be made of steel or other ferrous material with a thin coating or plating of copper or other non-ferrous material, since the current at radio frequencies travels mostly in the surface layer or skin and thus would flow mostly through the non-ferrous coating without causing serious eddy current losses in the ferrous body.

In all of the forms of condenser described, the condenser plates are completely surrounded by and shielded by the metal shell, thus resulting in very steady or uniform capacitance regardless of variations in external conditions outside the shell.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An electric condenser including an approximately cylindrical casing, a dielectric closure member near one end of said casing, said closure member including a flange extending into sealed relation to said casing and a tubular portion of substantial length arranged approximately centrally of said flange, a first series of metallic plates arranged with at least parts of their peripheries fitting substantially against the inner surface of said casing, spacing sleeves also fitting substantially against said inner surface of said casing and interposed between adjacent plates to hold them spaced from each other, a shaft extending through said tubular portion of said dielectric member in sealed relation thereto, and a second series of metallic plates mounted on said shaft in spaced relation to each other and interspersed with the plates of the first series.

2. An electric condenser for operation at an internal pressure different from surrounding atmospheric pressure, said condenser including an approximately cylindrical metal shell, a closure member of dielectric material mounted on said shell, said closure member including a flange having an approximately circular marginal seat portion in sealed relation to said shell, said flange extending from said seat portion obliquely inwardly toward the central axis of said shell and toward the region of higher pressure so that the portion of said flange adjacent said central axis is materially offset in an axial direction toward the region of higher pressure from the approximate plane of said marginal seat portion to form an arch-like closure for resisting the pressure difference between the interior and the exterior of the condenser, with the higher pressure on the convex side and the lower pressure on the concave side of said arch-like closure, said closure member including also a tubular portion integral with said oblique flange and extending from the central portion of said flange a substantial distance in an approximately axial direction, a first set of spaced metallic plates mounted within and electrically connected to said shell, metallic supporting means extending through said tubular portion of said dielectric member and into the interior of said shell, and a second set of metallic plates mounted on said supporting means in spaced relation to the plates of the first set and cooperating therewith to produce electric capacitance when said shell is at a different electric potential from said metallic supporting means.

3. An electric condenser for operation at an internal pressure different from surrounding atmospheric pressure, said condenser including a sealed casing with part thereof in the form of a dielectric member having a tubular portion, a first set of condenser plates mounted within said casing, supporting means extending into the interior of said casing through said tubular portion, a second set of condenser plates mounted within said casing on said supporting means, a metallic fixture mounted on the outer end of said tubular portion of said dielectric member in substantially gas-tight sealed relation thereto, said supporting means extending through said fixture, and a substantially gas-tight dome mounted on said fixture and enclosing the portion of said supporting means which projects through said fixture, to give sealing protection against ingress or egress of fluid between said supporting means and said fixture.

4. An electric condenser including a substantially cylindrical casing having an opening at one end and means associated therewith forming an abutment around said opening, a closure member extending across said opening and seated against the inner side of said abutment means so that said abutment means holds said closure member against outward movement from said opening, a first set of spaced metallic plates mounted within said casing and each having a periphery at least a part of which lies substantially against the inner surface of said casing, a spacing sleeve between each two adjacent plates, each sleeve lying substantially against the inner surface of said casing and having its ends abutting against the plates between which it is mounted to maintain said plates in spaced relation, a spacing sleeve having one end seated against an inner surface of said closure and the other end seated against that one of said plates which is closest to said closure, resilient means within said casing adjacent the end thereof remote from said closure, said resilient means pressing against said sleeves in a direction towards said closure and serving to maintain compression substantially constantly in all of said sleeves to hold said plates firmly with respect to each other and to hold said closure against said abutment means, a second set of spaced metallic plates within said casing, and means mounting the plates of said second set in spaced relation to and electrically insulated from the plates of the first set.

5. An electric condenser including an approximately cylindrical and gas-tight metal shell, intended to carry internal pressure different from external atmospheric pressure, and closed in a substantially gas-tight manner at one end, a seat associated with said shell in a gas-tight manner adjacent the opposite end, a closure member of dielectric material mounted on said shell to close said opposite end, said closure member including a flange having an approximately circular marginal seat portion seated against said seat on said shell in sealed relation thereto, said flange extending from said seat portion obliquely toward the central axis of the shell and also toward the region of higher pressure, so that the portion of said flange adjacent said central axis is materially offset in an axial direction from the approximate plane of said marginal seat portion toward the higher pressure, said closure member including also a tubular portion integral with said oblique flanged and extending from the central portion of said flange a substantial distance in an approximately axial direction, a first set of spaced metallic plates mounted within and electrically connected to said shell, a metallic supporting member extending through said tubular portion of said dielectric member in gas-tight sealed relation thereto and projecting into the interior of said shell, and a second set of metallic plates mounted on said supporting member in spaced relation to the plates of the first set and cooperating therewith to produce electric capacitance when said shell is at a different electric potential from said metallic supporting member.

6. An electric condenser including an approximately cylindrical and gas-tight metal shell, intended to carry internal pressure greater than external atmospheric pressure, and closed in a substantially gas-tight manner at one end, a seat associated with said shell in a gas-tight manner adjacent the opposite end, a closure member of dielectric material mounted on said shell to close said opposite end, said closure member including a flange having an approximately circular marginal seat portion seated against said seat on said shell in sealed relation thereto, said flange extending from said seat portion obliquely toward the central axis of the shell and also inwardly toward the first mentioned end of the shell, so that the portion of said flange adjacent said central axis is materially offset inwardly in an axial direction from the approximate plane of said marginal seat portion, said closure member including also a tubular portion integral with said oblique flange and extending from the central portion of said flange in an approximately axial direction outwardly toward the approximate plane of said marginal seat portion, a first set of spaced metallic plates mounted within and electrically connected to said shell, a metallic supporting member extending through said tubular portion of said dielectric member in gas-tight sealed relation thereto and projecting into the interior of said shell, and a second set of metallic plates mounted on said supporting member in spaced relation to the plates of the first set and cooperating therewith to produce electric capacitance when said shell is at a different electric potential from said metallic supporting member.

7. A construction as described in claim 6, in which said axially extending tubular portion of said dielectric closure member extends outwardly approximately as far as the approximate plane of said marginal seat portion.

8. An electric condenser including an approximately cylindrical and gas-tight metal shell, intended to carry internal pressure lower than external atmospheric pressure, and closed in a substantially gas-tight manner at one end, a seat associated with said shell in a gas-tight manner adjacent the opposite end, a closure member of dielectric material mounted on said shell to close said opposite end, said closure member including a flange having an approximately circular marginal seat portion seated against said seat on said shell in sealed relation thereto, said flange extending from said seat portion obliquely toward the central axis of the shell and also outwardly in a direction away from said first mentioned end of said shell, so that the portion of said flange adjacent said central axis is materially offset outwardly in an axial direction from the approximate plane of said marginal seat portion, said closure member including also a tubular portion integral with said oblique flange and extending from the central portion of said flange in an approximately axial direction inwardly toward the approximate plane of said marginal seat portion, a first set of spaced metallic plates mounted within and electrically connected to said shell, a metallic supporting member extending through said tubular portion of said dielectric member in gas-tight sealed relation thereto and projecting into the interior of said shell, and a second set of metallic plates mounted on said supporting member in spaced relation to the plates of the first set and cooperating therewith to produce electric capacitance when said shell is at a different electric potential from said metallic supporting member.

9. A construction as described in claim 8, in which said axially extending tubular portion of said dielectric closure member extends inwardly approximately as far as the approximate plane of said marginal seat portion.

10. An electric condenser for operation at an internal pressure different from surrounding atmospheric pressure, said condenser including a sealed casing having an opening therethrough, a first set of condenser plates mounted within said casing, supporting means extending into the interior of said casing through said opening, a second set of condenser plates mounted within said casing on said supporting means, and a substantially gas-tight dome mounted on said casing in sealed relation thereto and enclosing said opening and the outer end of said supporting means to give sealing protection against ingress or egress of fluid pressure between said supporting means and said opening.

11. An electric condenser for operation at an internal pressure different from surrounding atmospheric pressure, said condenser including a sealed casing having a tubular portion, a set of stator condenser plates mounted within said casing, rotor supporting means including a shaft extending through said tubular portion and rotatable within said tubular portion, a set of rotor condenser plates mounted within said casing on said rotor supporting means, gearing operatively connected to said shaft externally of said tubular portion for turning said shaft to vary the capacitance of said condenser, and a substantially gas-tight dome mounted in sealed relation to said tubular portion and enclosing said gearing and the outer end of said shaft to provide sealing protection against ingress or egress of fluid pressure to or from the interior of said casing along said shaft.

12. An electric condenser including a casing having an opening at one end and an inwardly faced seat around said opening, a closure member extending across said opening and seated against said seat, sleeve means within said casing engaging the inner surface of said closure member, resilient means within said casing constantly acting upon said sleeve means in a direction to hold said sleeve means under compressive stress and thereby to press said closure member firmly in an outward direction against said seat, and two sets of condenser plates mounted within said casing and insulated from each other to provide electrical capacitance between them.

13. A construction as described in claim 12, in which said casing is of substantially cylindrical form, in which said sleeve means fits relatively closely within the inner surface of the cylindrical casing and extends throughout the major portion of the axial length thereof, and in which said resilient means is in the form of a resilient annular ring with its outer margin pressing against the end of said sleeve means remote from said closure member.

14. An electric condenser including an approximately cylindrical and gas-tight metal shell intended to carry internal pressure different from external atmospheric pressure, and closed in a substantially gas-tight manner at one end, a seat associated with said shell in a gas-tight manner adjacent the opposite end, a closure member of dielectric material mounted on said shell to close said opposite end, said closure member including a flange having an approximately circular marginal seat portion seated against said seat on said shell in sealed relation thereto, said flange extending from said seat portion obliquely toward the central axis of the shell and also toward the region of higher pressure, so that the portion of said flange adjacent said central axis is materially offset in an axial direction from the approximate plane of said marginal seat portion toward the higher pressure, said closure member including also a tubular portion integral with said oblique flange and extending from the central portion of said flange a substantial distance in an approximately axial direction, a first metallic electrode mounted within and electrically connected to said shell, a metallic supporting member extending through said tubular portion of said dielectric member in gas-tight sealed relation thereto and projecting into the interior of said shell, and a second electrode mounted on said supporting member in spaced relation to said first electrode and cooperating therewith to produce electric capacitance when said shell is at a different electric potential from said metallic supporting member.

15. An electric condenser for operation at an internal pressure different from surrounding atmospheric pressure, said condenser including a sealed casing having an opening therethrough, a first condenser electrode mounted within said casing, supporting means extending into the interior of said casing through said opening, a second condenser electrode mounted within said casing on said supporting means, and a substantially gas-tight dome mounted on said casing in sealed relation thereto and enclosing said opening and the outer end of said supporting means to give sealing protection against ingress or egress of fluid pressure between said supporting means and said opening.

16. An electric condenser capable of operating at an internal fluid pressure different from atmospheric pressure, said condenser including an approximately cylindrical casing, said casing having an annular groove extending circumferentially around the inner surface thereof near one end of said casing, means comprising an annular ring seated in said groove and forming an inwardly extending annular shoulder faced toward the higher pressure and held against movement axially of said casing in a direction toward the lower pressure, a dielectric closure member extending across said casing near said end and seated substantially against the side of said shoulder which is toward the higher pressure, so that an increase in the fluid pressure difference within and without said casing will tend to seat said dielectric member more firmly against said shoulder, means closing the opposite end of said casing in a substantially fluid tight manner, a first metallic electrode mounted within said casing and a second metallic electrode within said casing and spaced from the first electrode and supported from said dielectric member.

17. An electric condenser capable of operating at an internal fluid pressure different from atmospheric pressure, said condenser including an approximately cylindrical casing, means near one end of said casing forming an inwardly extending annular shoulder faced toward the higher pressure and held against movement axially of said casing in a direction toward the lower pressure, a dielectric closure member extending across said casing near said end and seated substantially against the side of said shoulder which is toward the higher pressure, so that an increase in the fluid pressure difference within and without said casing will tend to seat said dielectric member more firmly against said shoulder, said dielectric member being dished from said seat in a direction toward the higher pressure to withstand better the difference in fluid pressure on opposite sides of said members, means closing the opposite end of said casing in a substantially fluid tight manner, a first metallic electrode mounted within said casing, and a second metallic electrode within said casing and spaced from the first electrode and supported from said dielectric member.

RALPH L. JENNER.